United States Patent
Yee et al.

(10) Patent No.: US 11,321,602 B1
(45) Date of Patent: May 3, 2022

(54) TRANSACTION CARD WITH BANKNOTE CLIP

(71) Applicant: Capital One Services, LLC, McLean, VA (US)

(72) Inventors: Bryant Yee, Washington, DC (US); Eric Loucks, Highlands Ranch, CO (US); Cruz Vargas, Denver, CO (US); Joshua Peters, Charlottesville, VA (US)

(73) Assignee: Capital One Services, LLC, McLean, VA (US)

( * ) Notice: Subject to any disclaimer, the term of this patent is extended or adjusted under 35 U.S.C. 154(b) by 0 days.

(21) Appl. No.: 17/302,567

(22) Filed: May 6, 2021

(51) Int. Cl.
*G06K 19/077* (2006.01)
*G06K 19/07* (2006.01)
*G06K 19/02* (2006.01)

(52) U.S. Cl.
CPC ....... *G06K 19/0772* (2013.01); *G06K 19/025* (2013.01); *G06K 19/0723* (2013.01)

(58) Field of Classification Search
CPC ........ G06K 19/00; G06K 19/04; G06K 19/06; G06K 19/067; G06K 19/07
USPC ................. 235/492, 487, 380, 375
See application file for complete search history.

(56) References Cited

U.S. PATENT DOCUMENTS

| | | | |
|---|---|---|---|
| 5,913,618 A * | 6/1999 | Yosha | G09F 3/20 40/658 |
| 2005/0155208 A1* | 7/2005 | Schneider, III | A45C 1/06 29/450 |
| 2008/0245857 A1 | 10/2008 | Lazarowicz et al. | |
| 2009/0039154 A1* | 2/2009 | Williams | G06K 19/07758 235/380 |
| 2013/0340215 A1* | 12/2013 | McGourthy | B42F 1/006 24/505 |

* cited by examiner

*Primary Examiner* — Edwyn Labaze
(74) *Attorney, Agent, or Firm* — Harrity & Harrity, LLP

(57) ABSTRACT

In some implementations, a transaction card may include a card body having a first surface and a second surface opposite the first surface. The card body may include a clip element that is defined by a slit in the card body from the first surface to the second surface. The clip element may be configured to flex relative to the card body. The transaction card may include at least one of an integrated circuit chip or a magnetic strip adjoined to the card body.

20 Claims, 4 Drawing Sheets

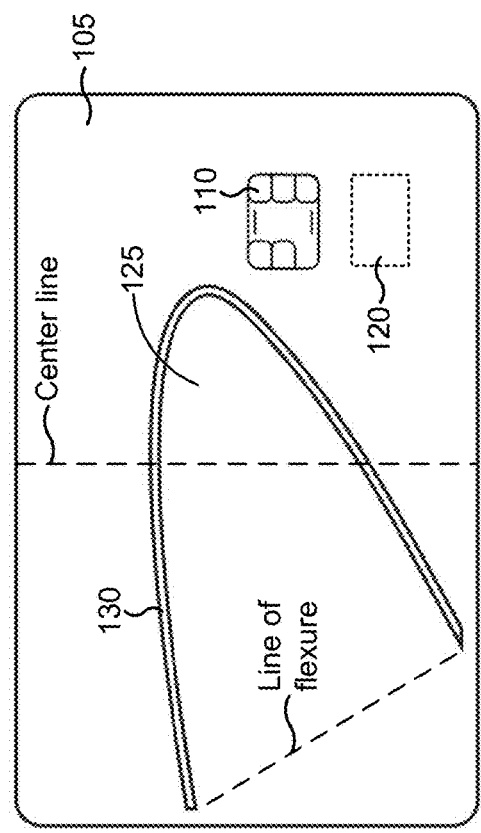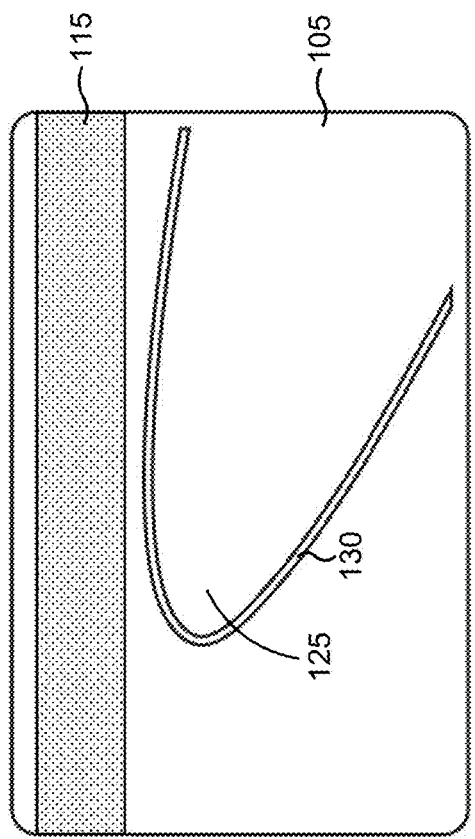
FIG. 1A
FIG. 1B

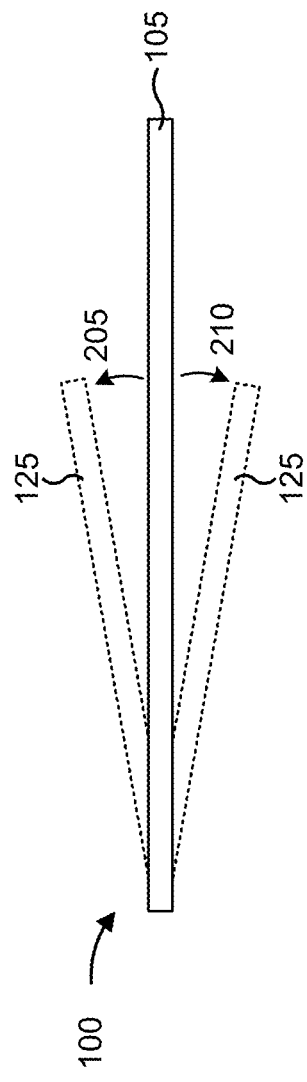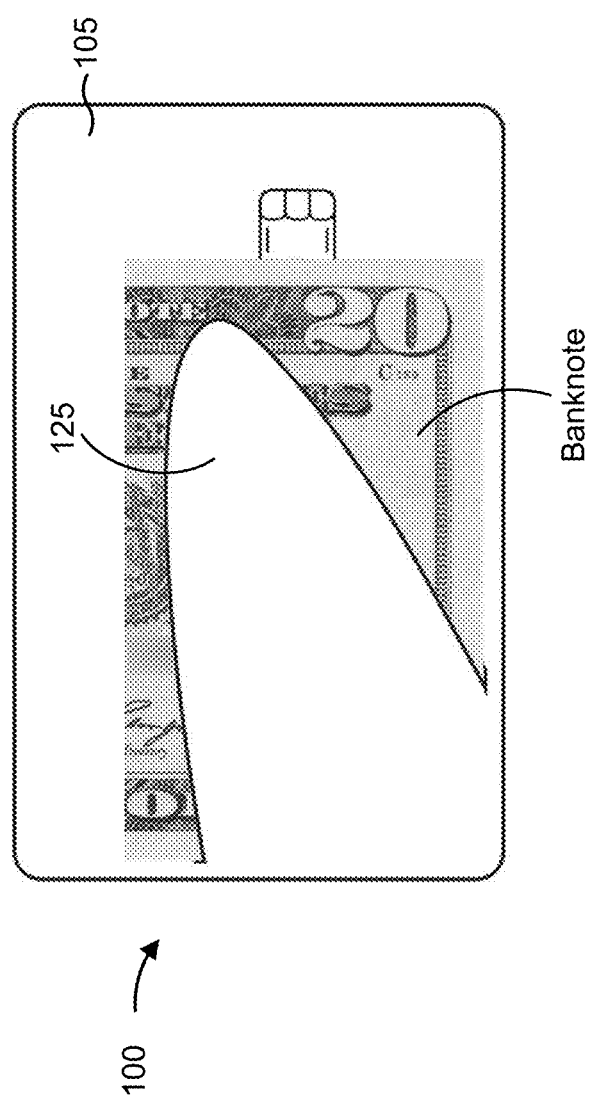

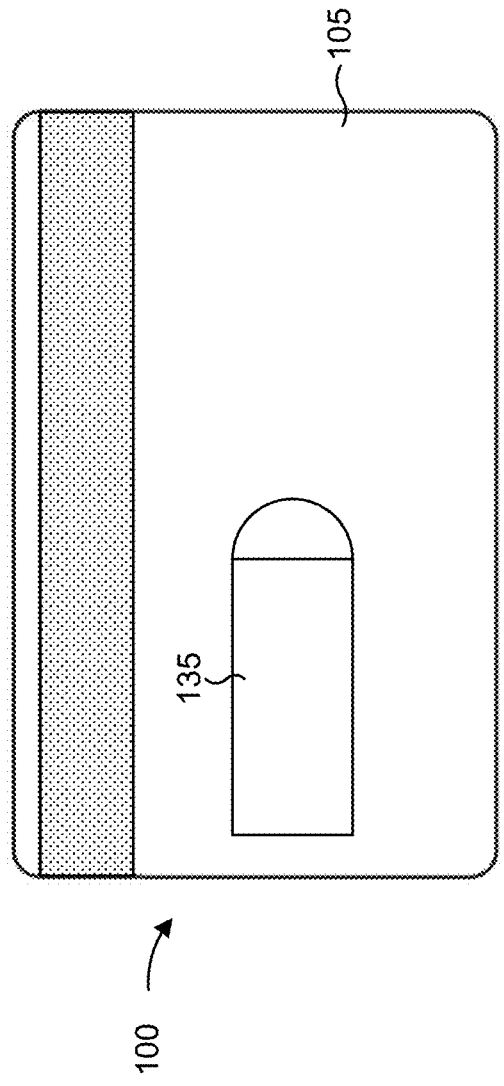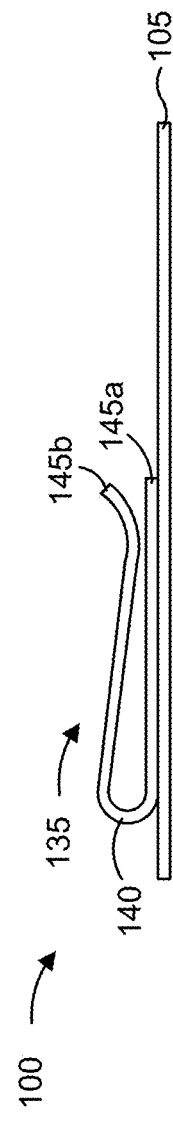
FIG. 4A
FIG. 4B

TRANSACTION CARD WITH BANKNOTE CLIP

BACKGROUND

Transactions often involve use of a transaction card (e.g., a credit card, a debit card, a gift card, an automated teller machine (ATM) card, a rewards card or client loyalty card, or the like) to pay for products or services at a transaction terminal (e.g., a point of sale (PoS) terminal) of an individual or business engaged in the sale of goods or services, for example, via a swiping of the transaction card at a card reader, insertion of the transaction card into a chip reader, or wireless transmission of transaction card data to a wireless receiver. In some instances, a magnetic strip, integrated circuit (IC) chip, radio frequency (RF) antenna, and/or RF identification (RFID) tag may be included in a transaction card to provide information associated with the transaction card (e.g., an account identifier, account information, a payment token, or the like).

SUMMARY

In some implementations, a transaction card includes a card body having a first surface and a second surface opposite the first surface, the card body including a clip element that is defined by a slit in the card body from the first surface to the second surface, the clip element configured to flex relative to the card body; and at least one of an integrated circuit chip or a magnetic strip adjoined to the card body.

In some implementations, a transaction card includes a card body having a first surface and a second surface opposite the first surface; a clip element configured to retain at least one banknote to the card body; and at least one of an integrated circuit chip or a magnetic strip adjoined to the card body.

In some implementations, a transaction card includes a card body having a first surface and a second surface opposite the first surface, the card body including a clip element that is defined by a slit in the card body from the first surface to the second surface, the clip element configured to flex relative to the card body.

BRIEF DESCRIPTION OF THE DRAWINGS

FIG. 1A is a front view of an example embodiment of a transaction card.

FIG. 1B is a back view of the example embodiment transaction card.

FIG. 2A is a side view of the example embodiment of the transaction card.

FIG. 2B is a front view of the example embodiment of the transaction card in use with a banknote.

FIG. 4A is a back view of a different example embodiment of the transaction card.

FIG. 4B is a side view of the different example embodiment of the transaction card.

DETAILED DESCRIPTION

Figure 3:
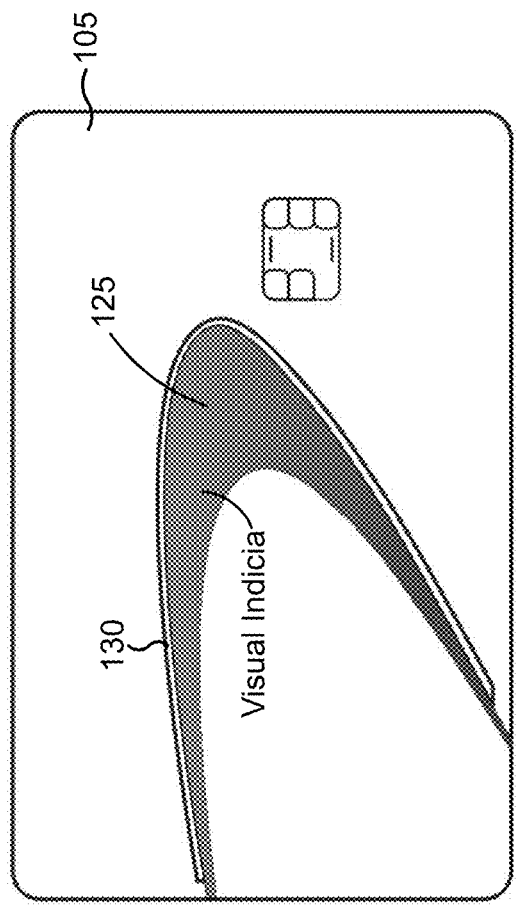
FIG. 3 is a front view of the example embodiment of the transaction card with visual indicia.

The following detailed description of example implementations refers to the accompanying drawings. The same reference numbers in different drawings may identify the same or similar elements.

An individual may carry a storage article, such as a wallet, a billfold, a purse, or the like, to store one or more transaction cards, one or more banknotes (e.g., paper currency), or the like. Often, the storage article may be excessively bulky for a particular activity in which the individual is engaging (e.g., athletic activities). Sometimes, the individual may desire a more compact storage article for convenience, comfort, aesthetics, or the like.

In some cases, a money clip (which may also be referred to as a banknote clip or a cash clip) may provide relatively compact storage for one or more transaction cards, one or more banknotes, or the like. The money clip may include an elongate strip of metal that is folded end-to-end to form a clip, whereby the transaction card(s) and/or banknote(s) are wedged into the clip for secure storage. However, the money clip adds additional bulkiness and weight to the transaction card(s) and/or banknote(s), which is not optimal for compact storage. Additionally, due to having a relatively small form factor, the money clip may be easily lost when not in use.

Some implementations described herein provide a transaction card that includes a clip element for retaining banknotes to the transaction card. In some implementations, the clip element may be integral to a card body of the transaction card. For example, the clip element may be defined in the card body by a slit (e.g., a curved slit) that is cut into the card body. In some implementations, the clip element may be affixed to the card body of the transaction card. In this way, the transaction card may additionally function as a money clip, such that banknotes can be stored on the transaction card without the use of a separate storage article or money clip. Accordingly, the transaction card described herein achieves compact and lightweight combined storage for the transaction card and one or more banknotes.

FIG. 1A is a front view of an example embodiment of a transaction card 100, and FIG. 1B is a back view of the example embodiment of the transaction card 100. As shown, the transaction card 100 may include a card body 105. The card body 105 may have a generally rectangular shape; however, other shapes are possible. For example, the card body 105 may be about (e.g., ±5%) 85 millimeters (mm) (e.g., 85.6 mm) by about 54 mm (e.g., 53.98 mm), and have a thickness of about 0.75 mm (e.g., 0.76 mm). These dimensions may correspond to the dimensions of a standard transaction card. In some implementations, the card body 105 may be thicker than a standard transaction card in order to withstand repetitive flexing and/or exert greater elastic force, as described below. For example, the card body 105 may have a thickness from about 0.8 mm to about 1.2 mm. The card body 105 may include (e.g., may be composed of) a resilient material (e.g., a material that returns to an equilibrium position following deformation). For example, the card body 105 may include a plastic (e.g., polyvinyl chloride (PVC)) and/or a metal (e.g., steel).

The card body 105 may include a thin substrate upon which information or visual indicia is printed, upon which one or more account identification elements are adjoined, or the like. The card body 105 has a first surface (e.g., a front surface, as shown in FIG. 1A) and a second surface (e.g., a back surface, as shown in FIG. 1B) opposite the first surface.

In some implementations, the transaction card 100 may include one or more account identification elements (e.g., an integrated circuit (IC) chip (e.g., a EUROPAY®, MASTERCARD®, VISA® (EMV) chip), a magnetic strip, a barcode, a radio frequency (RF) identification (RFID) element 125 (e.g., an RFID tag and/or an RF antenna, among other examples), a near-field communication (NFC) component, a Bluetooth component, and/or a Bluetooth Low Energy (BLE) component, among other examples). The account identification element(s) may store and/or encode information that identifies an account that is associated with the transaction card 100. The information stored or encoded by the account identification element(s) may be read by a transaction terminal (e.g., a point of sale (PoS) terminal) and/or the account identification element(s) may communicate with the transaction terminal to convey the information.

In some implementations, at least one of (e.g., one or more of) an IC chip 110 and/or a magnetic strip 115 may be adjoined to (e.g., affixed to, embedded in, or the like) the card body 105. Additionally, or alternatively, an RFID element 120 (e.g., an RFID tag and/or an RF antenna) may be in (e.g., embedded in) the card body 105. In some examples, the IC chip 110 may be adjoined to the first surface of the card body 105 and/or the magnetic strip 115 may be adjoined to the second surface of the card body 105. As described above, the card body 105 may also include printed information (e.g., on the first surface and/or the second surface), such as a name of an entity (e.g., a financial institution) associated with the transaction card 100, a name of an individual associated with the transaction card 100, and/or an account identifier (e.g., an account number) associated with the transaction card 100, among other examples.

The transaction card 100 may include a clip element 125 (e.g., a single clip element 125). In some implementations, the clip element 125 may be defined by a slit 130 (e.g., a cut) in the card body 105 (and a line of flexure, as described below). For example, the slit 130 may extend through the card body 105 from the first surface to the second surface of the card body 105. In some implementations, the card body 105 may be formed without the slit 130, and the slit 130 may be cut, stamped, or the like, into the card body 105. In some other implementations, the card body 105 may be formed (e.g., by additive manufacturing, molding, or the like) to include the slit 130.

In some implementations, the slit 130 may be curved. Additionally, or alternatively, the slit 130 may be U-shaped (e.g., arc-shaped). A U-shape may include a symmetrical or a non-symmetrical U-shape as well as a curved or an angular U-shape. The slit 130, and therefore the clip element 125, may be asymmetrical (e.g., lack a line of symmetry). In some examples, the slit 130, and therefore the clip element 125, may be asymmetrical relative to a center line (e.g., a longitudinal line), as shown, of the card body 105 and asymmetrical relative to an orthogonal center line of the card body 105. Moreover, the clip element 125 may encompass at least 30%, at least 40%, or at least 50% of an area of the card body 105.

The slit 130 may be a single, continuous slit (e.g., having only two endpoints). The slit 130 may be confined to an interior of the card body 105 (e.g., the slit 130 does not extend to any edge of the card body 105). For example, a first endpoint of the slit 130 may be away from the edges of the card body 105, and a second endpoint of the slit 130 may be away from the edges of the card body 105. In some examples, the first endpoint of the slit 130 may be nearest to a first edge of the card body 105 (e.g., a closest edge of the card body 105 to the first endpoint is the first edge), and the second endpoint of the slit 130 may be nearest to a second edge of the card body 105 (e.g., a closest edge of the card body 105 to the second endpoint is the second edge). The first edge and the second edge may be adjacent edges of the card body 105 (e.g., the first edge is adjacent to the second edge).

In some implementations, the endpoints of the slit 130 are both located at a first half of the card body 105 (e.g., relative to the center line, as shown, of the card body 105). Moreover, the slit 130 may extend between the first half of the card body 105 and a second half of the card body 105. Accordingly, the clip element 125 may extend from the first half of the card body 105 to the second half of the card body 105. In this way, the clip element 125 may securely retain at least one banknote to the card body 105, as described below in connection with FIG. 2B. The slit 130 may be located to avoid intersection with the IC chip 110 (if present), the magnetic strip 115 (if present), and/or the RFID element 120 (if present).

The endpoints of the slit 130 may define a line of flexure (e.g., a line that connects the endpoints of the slit 130) of the clip element 125. The line of flexure may be angled (e.g., neither parallel nor perpendicular) relative to the edges of the card body 105. The angled line of flexure, in combination with the endpoints of the slit 130 being near adjacent edges of the card body 105 (as described above), maximizes an area of the card body 105 that a banknote may occupy while maintaining a physical integrity of the card body 105 (e.g., a line of flexure near to, and parallel to, an edge of the card body 105 may result in tearing of the card body 105 when the clip element 125 is flexed).

As indicated above, FIGS. 1A-1B are provided as an example. Other examples may differ from what is described with regard to FIGS. 1A-1B.

FIG. 2A is a side view of the example embodiment of the transaction card 100. As shown in FIG. 2A, the clip element 125 may be configured to flex (e.g., bend away from an equilibrium position) relative to the card body 105 (e.g., the slit 130 defines the clip element 125 and a remaining portion of the card body 105, and the clip element 125 is configured to flex relative to the remaining portion of the card body 105). For example, the clip element 125 may be configured to flex away from the first surface of the card body 105 or to flex away from the second surface of the card body 105 (e.g., about the line of flexure, as shown in FIG. 1A). In some examples, the clip element 125 may be configured to flex away from the first surface of the card body 105 in a first position 205 of the clip element 125, and the clip element 125 may be configured to flex away from the second surface of the card body 105 in a second position 210 of the clip element 125. The clip element 125 may flex relative to the card body 105 when an external force (e.g., exerted by a finger of a user) is applied to the clip element 125.

As indicated above, FIG. 2A is provided as an example. Other examples may differ from what is described with regard to FIG. 2A.

FIG. 2B is a front view of the example embodiment of the transaction card 100 in use with a banknote. The clip element 125 may be configured to retain paper to the card body 105. For example, as shown in FIG. 2B, the clip element 125 may be configured to retain at least one banknote (e.g., folded into thirds, as shown) to the card body 105. Accordingly, an elastic force exerted by the clip element 125 when the clip element 125 is flexed is sufficient to retain at least one banknote to the card body.

The location and orientation of the slit 130, as described above, may enable retention of the banknote at a corner of the card body 105 (e.g., the slit 130 may be configured, as described above, such that a portion of the banknote can extend beyond the line of flexure, as shown in FIG. 1A). In this way, interference by the banknote with account identification element(s) of the transaction card 100 can be reduced or eliminated.

As indicated above, FIG. 2B is provided as an example. Other examples may differ from what is described with regard to FIG. 2B.

FIG. 3 is a front view of the example embodiment of the transaction card 100 with visual indicia. As described above, the first surface and/or the second surface of the card body 105 may include the visual indicia. For example, the visual indicia may be printed on the card body 105, stamped on the card body 105, or the like. The visual indicia may be located on the clip element 125. The visual indicia may be a logo, a picture, an image, or the like.

In some implementations, the slit 130 extends along at least a portion of a perimeter of the visual indicia on a surface (e.g., at least one of the first surface or the second surface) of the card body 105. In other words, the slit 130 bounds at least a portion of a perimeter of the visual indicia. In this way, during use of the clip element 125 to retain a banknote, the visual indicia may be prominent and unobstructed. For example, if the visual indicia identifies a financial institution associated with the transaction card 100, a user of the transaction card 100 may be able to identify the transaction card, without removing or adjusting the banknote, based on the visual indicia on the clip element 125.

As indicated above, FIG. 3 is provided as an example. Other examples may differ from what is described with regard to FIG. 3.

FIG. 4A is a back view of a different example embodiment of the transaction card 100. As shown in FIG. 4A, the transaction card 100 may include a clip element 135. As shown, the clip element 135 is positioned on the second surface (e.g., the back surface) of the card body 105. However, additionally or alternatively, the clip element 135 may be positioned on the first surface (e.g., the front surface) of the card body 105.

The clip element 135 may be configured to retain paper, such as at least one banknote, to the card body 105, in a similar manner as described above. In some implementations, the transaction card 100 may include the clip element 135 additionally or alternatively to the clip element 125. The clip element 135 may include (e.g., may be composed of) a resilient material. For example, the clip element 135 may include a plastic (e.g., PVC) and/or a metal (e.g., steel).

The clip element 135 may be affixed to the card body 105. For example, the clip element 135 may be affixed to the card body 105 using an adhesive, adhesive tape, or the like. As another example, at least a portion of the clip element 135 may be embedded in the card body 105 (e.g., using additive manufacturing, molding, or the like) to thereby affix the clip element 135 to the card body 105.

As indicated above, FIG. 4A is provided as an example. Other examples may differ from what is described with regard to FIG. 4A.

FIG. 4B is a side view of the different example embodiment of the transaction card 100. As shown in FIG. 4B, the clip element 135 may include an elongate strip 140, which may include one or more bends to facilitate connection to the transaction card 100 and/or to facilitate retention or removal of a banknote from the clip element 135. In some implementations, as shown, the elongate strip 140 may be folded end-to-end to form a first opposing arm 145a and a second opposing arm 145b of the clip element 135. Here, the first opposing arm 145a may be affixed to the card body 105, and the second opposing arm 145b may be free. In some implementations, a single end of the elongate strip may be affixed to the card body 105 in a cantilevered arrangement, and the other end of the elongate strip may be free (not shown).

The clip element 135 may be configured to flex relative to (e.g., away from) the card body 105. For example, the clip element 135 may flex relative to the card body 105 when an external force (e.g., exerted by a finger of a user) is applied to the clip element 135, in a similar manner as described above. Thus, the clip element 135 may be configured to retain at least one banknote to the card body 105 using an elastic force, in a similar manner as described above.

As indicated above, FIG. 4B is provided as an example. Other examples may differ from what is described with regard to FIG. 4B.

The foregoing disclosure provides illustration and description, but is not intended to be exhaustive or to limit the implementations to the precise forms disclosed. Modifications may be made in light of the above disclosure or may be acquired from practice of the implementations.

As used herein, the term "component" is intended to be broadly construed as hardware, firmware, or a combination of hardware and software. It will be apparent that systems and/or methods described herein may be implemented in different forms of hardware, firmware, and/or a combination of hardware and software. The actual specialized control hardware or software code used to implement these systems and/or methods is not limiting of the implementations. Thus, the operation and behavior of the systems and/or methods are described herein without reference to specific software code—it being understood that software and hardware can be used to implement the systems and/or methods based on the description herein.

Although particular combinations of features are recited in the claims and/or disclosed in the specification, these combinations are not intended to limit the disclosure of various implementations. In fact, many of these features may be combined in ways not specifically recited in the claims and/or disclosed in the specification. Although each dependent claim listed below may directly depend on only one claim, the disclosure of various implementations includes each dependent claim in combination with every other claim in the claim set. As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiple of the same item.

No element, act, or instruction used herein should be construed as critical or essential unless explicitly described as such. Also, as used herein, the articles "a" and "an" are intended to include one or more items, and may be used interchangeably with "one or more." Further, as used herein, the article "the" is intended to include one or more items referenced in connection with the article "the" and may be used interchangeably with "the one or more." Furthermore, as used herein, the term "set" is intended to include one or more items (e.g., related items, unrelated items, or a combination of related and unrelated items), and may be used interchangeably with "one or more." Where only one item is intended, the phrase "only one" or similar language is used. Also, as used herein, the terms "has," "have," "having," or the like are intended to be open-ended terms. Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

What is claimed is:

1. A transaction card, comprising:
a card body having a first surface and a second surface opposite the first surface,
the card body including a clip element that is defined by a slit in the card body from the first surface to the second surface,
the clip element configured to flex away from the first surface of the card body in a first position of the clip element, and
the clip element is configured to flex away from the second surface of the card body in a second position of the clip element; and
at least one of an integrated circuit chip or a magnetic strip adjoined to the card body.

2. The transaction card of claim 1, wherein the integrated circuit chip is adjoined to the first surface of the card body and the magnetic strip is adjoined to the second surface of the card body.

3. The transaction card of claim 1, further comprising:
a radio frequency identification (RFID) element in the card body.

4. The transaction card of claim 1, wherein the card body includes a resilient material.

5. The transaction card of claim 1, wherein the slit is curved.

6. The transaction card of claim 1, wherein the slit is U-shaped.

7. The transaction card of claim 1, wherein the slit extends along at least a portion of a perimeter of a visual indicia on at least one of the first surface or the second surface of the card body.

8. The transaction card of claim 1, wherein the clip element is configured to retain at least one banknote to the card body.

9. The transaction card of claim 1, wherein the clip element includes:
a first end in a first half of the card body,
the first end defined by a pair of endpoints of the slit, and
a second end in a second half of the card body.

10. A transaction card, comprising:
a card body having a first surface and a second surface opposite the first surface;
a clip element configured to retain at least one banknote to the card body,
wherein the clip element is configured to flex away from the first surface of the card body in a first position of the clip element, and
wherein the clip element is configured to flex away from the second surface of the card body in a second position of the clip element; and
at least one of an integrated circuit chip or a magnetic strip adjoined to the card body.

11. The transaction card of claim 10, wherein the clip element is defined in the card body.

12. The transaction card of claim 11, wherein the clip element is defined in the card body by a slit in the card body from the first surface to the second surface.

13. The transaction card of claim 12, wherein the slit extends along at least a portion of a perimeter of a visual indicia on at least one of the first surface or the second surface of the card body.

14. The transaction card of claim 10, wherein the clip element is affixed to the card body.

15. The transaction card of claim 10, wherein the clip element includes:
a first end in a first half of the card body, and
a second end in a second half of the card body.

16. A transaction card, comprising:
a card body having a first surface and a second surface opposite the first surface,
the card body including a clip element that is defined by a slit in the card body from the first surface to the second surface,
the clip element configured to flex away from the first surface of the card body in a first position of the clip element, and
the clip element configured to flex away from the second surface of the card body in a second position of the clip element.

17. The transaction card of claim 16, wherein the slit extends along at least portions of perimeters of visual indicia on the first surface and the second surface of the card body.

18. The transaction card of claim 16, wherein the clip element is asymmetrical.

19. The transaction card of claim 16, wherein a first endpoint of the slit is nearest to a first edge of the card body, and a second endpoint of the slit is nearest to a second edge of the card body, and
wherein the first edge is adjacent to the second edge.

20. The transaction card of claim 16, wherein a first endpoint of the slit is away from edges of the card body, and a second endpoint of the slit is away from the edges of the card body.

* * * * *